United States Patent
Aggarwal (10) Patent No.: US 7,506,370 B2
(45) Date of Patent: Mar. 17, 2009

(54) MOBILE SECURITY ARCHITECTURE

(75) Inventor: Sudhir Aggarwal, Tallahasee, FL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1050 days.

(21) Appl. No.: 10/428,722

(22) Filed: May 2, 2003

(65) Prior Publication Data

US 2004/0221154 A1 Nov. 4, 2004

(51) Int. Cl.
  H04L 9/00 (2006.01)
  H04K 1/00 (2006.01)
  G06F 15/16 (2006.01)
(52) U.S. Cl. .................. 726/14; 713/168; 380/259
(58) Field of Classification Search .............. None
  See application file for complete search history.

(56) References Cited

U.S. PATENT DOCUMENTS

| | | | | |
|---|---|---|---|---|
| 6,584,567 B1 * | 6/2003 | Bellwood et al. | ......... | 713/171 |
| 6,681,017 B1 * | 1/2004 | Matias et al. | ......... | 380/277 |
| 6,769,000 B1 * | 7/2004 | Akhtar et al. | ......... | 707/103 R |
| 6,792,534 B2 * | 9/2004 | Medvinsky | ......... | 713/171 |
| 6,879,690 B2 * | 4/2005 | Faccin et al. | ......... | 380/247 |
| 7,046,647 B2 * | 5/2006 | Oba et al. | ......... | 370/331 |
| 2002/0026503 A1 * | 2/2002 | Bendinelli et al. | ......... | 709/220 |
| 2002/0026531 A1 * | 2/2002 | Keane et al. | ......... | 709/250 |
| 2002/0029276 A1 * | 3/2002 | Bendinelli et al. | ......... | 709/227 |
| 2002/0056008 A1 * | 5/2002 | Keane et al. | ......... | 709/245 |
| 2002/0069278 A1 * | 6/2002 | Forslow | ......... | 709/225 |
| 2002/0087643 A1 * | 7/2002 | Parsons et al. | ......... | 709/206 |
| 2002/0091859 A1 * | 7/2002 | Tuomenoksa et al. | ......... | 709/245 |
| 2002/0099937 A1 * | 7/2002 | Tuomenoksa | ......... | 713/153 |
| 2002/0147820 A1 * | 10/2002 | Yokote | ......... | 709/229 |
| 2003/0120733 A1 * | 6/2003 | Forman | ......... | 709/206 |
| 2003/0131259 A1 * | 7/2003 | Barton et al. | ......... | 713/201 |
| 2003/0147537 A1 * | 8/2003 | Jing et al. | ......... | 380/277 |
| 2003/0166397 A1 * | 9/2003 | Aura | ......... | 455/410 |
| 2004/0087304 A1 * | 5/2004 | Buddhikot et al. | ......... | 455/426.2 |
| 2004/0103275 A1 * | 5/2004 | Ji et al. | ......... | 713/150 |
| 2005/0152305 A1 * | 7/2005 | Ji et al. | ......... | 370/328 |
| 2006/0090074 A1 * | 4/2006 | Matoba | ......... | 713/171 |

* cited by examiner

*Primary Examiner*—Christopher A Revak (57) ABSTRACT

Security and mobility overlay architecture (SAMOA) includes security management and secure transport functions for fixed or mobile security subscriber units (SSUs). SSUs within SAMOA are authenticated, authorized, and provided with shared session keys by the security management function. The keys allow each SSU to communicate with the secure transport network, which provides secure connections to other SSUs. Because shared-key, rather than public-key session keys are preferably used, the problems associated with public-key certificate authorities and hierarchies are avoided. The security management function and the secure transport network can be layered efficiently on top of existing Internet protocol (IP) networks and are thus applicable to a wide range of systems that support IP, including 3G wireless, wireless LANs (e.g., 802.11x), wired LANs, and dial-up networks.

35 Claims, 1 Drawing Sheet

FIG. 1

MOBILE SECURITY ARCHITECTURE

BACKGROUND OF THE INVENTION

1. Field of the Invention

The present invention relates to network communications and, more specifically, to secure mobile communication architectures.

2. Description of the Related Art

The recent explosion in the growth and availability of mobile devices (e.g., laptops, PDAs, and intelligent cellphones) combined with increasing corporate and government concerns with secure communication of confidential business and intelligence data has created a genuine interest, and probably a good business case, for efficient, mobile, security solutions that would allow "road warriors" and others to communicate securely with each other and with network-based resources (e.g., corporate servers, intranets, and secure web sites). The diversity of relevant devices and networks includes 3G wireless networks, wireless LANs, dial-up connections, broadband voice/video/data networks, and wired LANs.

Current attempts to provide such solutions generally depend on natively insecure network protocols such as mobile Internet protocol (IP), IP version 4 (IPv4), and IP version 6 (IPv6) overlaid by end-to-end security protocols (e.g., Internet Engineering Task Force (IETF) IP security (IPSEC)). They also include link-level solutions such as Microsoft's extensible access protocol (EAP), which is directed toward protecting roughly the last 30 feet of a link (e.g., between a wireless subscriber and a wireless LAN port access entity (PAE)). These efforts have resulted in complex solutions characterized by non-interoperable, heterogeneous systems with complex interfaces and multiple authentication/encryption solutions inefficiently layered one on top of another.

SUMMARY OF THE INVENTION

Problems in the prior art are addressed in accordance with principles of the invention by a security management and secure transport architecture and service for fixed or mobile security subscriber units (SSUs) (e.g., content servers, PCs, PDAs, cellphones, and laptops). In the security and mobility overlay architecture of this invention (herein "SAMOA"), SSUs are authenticated, authorized, and provided with shared session keys by a security management function. The keys allow each SSU to communicate with a secure transport network, which provides secure connections to other SSUs. Because shared-key, rather than public-key, session keys are preferably used, the problems associated with public-key certificate authorities and hierarchies are avoided. The security management function and the secure transport network can be layered efficiently on top of existing Internet protocol (IP) networks and are thus applicable to a wide range of systems that support IP, including 3G wireless, wireless LANs (e.g., 802.11x), wired LANs, and dial-up networks.

In one embodiment, the present invention is a security management and secure transport system. The system includes a security agent node group (SANG) having at least one security agent node (SAN) and a transport agent node group (TANG) having at least one transport agent node (TAN). A security subscriber unit (SSU) communicates with the SANG over a non-secure link to establish a first session key at the SSU. The SAN communicates with the TANG to establish the first session key at the TANG. Using a secure link based on this first session key, the SSU communicates with the TANG.

In another embodiment, the present invention is a method for security management and secure transport. The method involves linking one or more security agent nodes (SANs) to each other, via a first secure protocol, into a security agent node group (SANG) and linking one or more transport agent nodes (TANs) to each other, via a second secure protocol, into a transport agent node group (TANG). The method further involves providing a first shared key to a first security subscriber unit (SSU), wherein the first shared key is known to the SANG, and using the first shared key to establish a first session key that allows the first SSU to securely connect to the TANG.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Overview

The SAMOA network operates at the network layer, i.e., layer three of the International Standards Organization (ISO) Opens Systems Interconnect (OSI) seven-layer model. The SAMOA network includes a distributed security management function and a secure transport network. In one embodiment, the secure transport network includes multiple transport agent nodes (TANs) linked securely via IP security (IPSEC) into a geographically distributed transport agent node group (TANG). The security management function includes logical security agent nodes (SANs) that are also linked securely to each other via IPSEC into a geographically distributed security agent node group (SANG). The TANG serves as a backbone for secure communications, in some implementations providing TAN-to-TAN routing and quality of service for SSUs. The SANG serves as a system-wide security authority, managing SSU subscription, billing, access control, authentication, and provision of SSUs with subscription keys. The SANG also manages the distribution of shared keys to TANG and SANG nodes. Within SAMOA, access to the secure network is accomplished via registration by a security subscriber unit (SSU) with a SAN via an initial access node (IAN). The IAN is not necessarily a secure element but it is the first hop entity that interacts with an SSU.

Secure-to-Secure Embodiment

Figure 1:
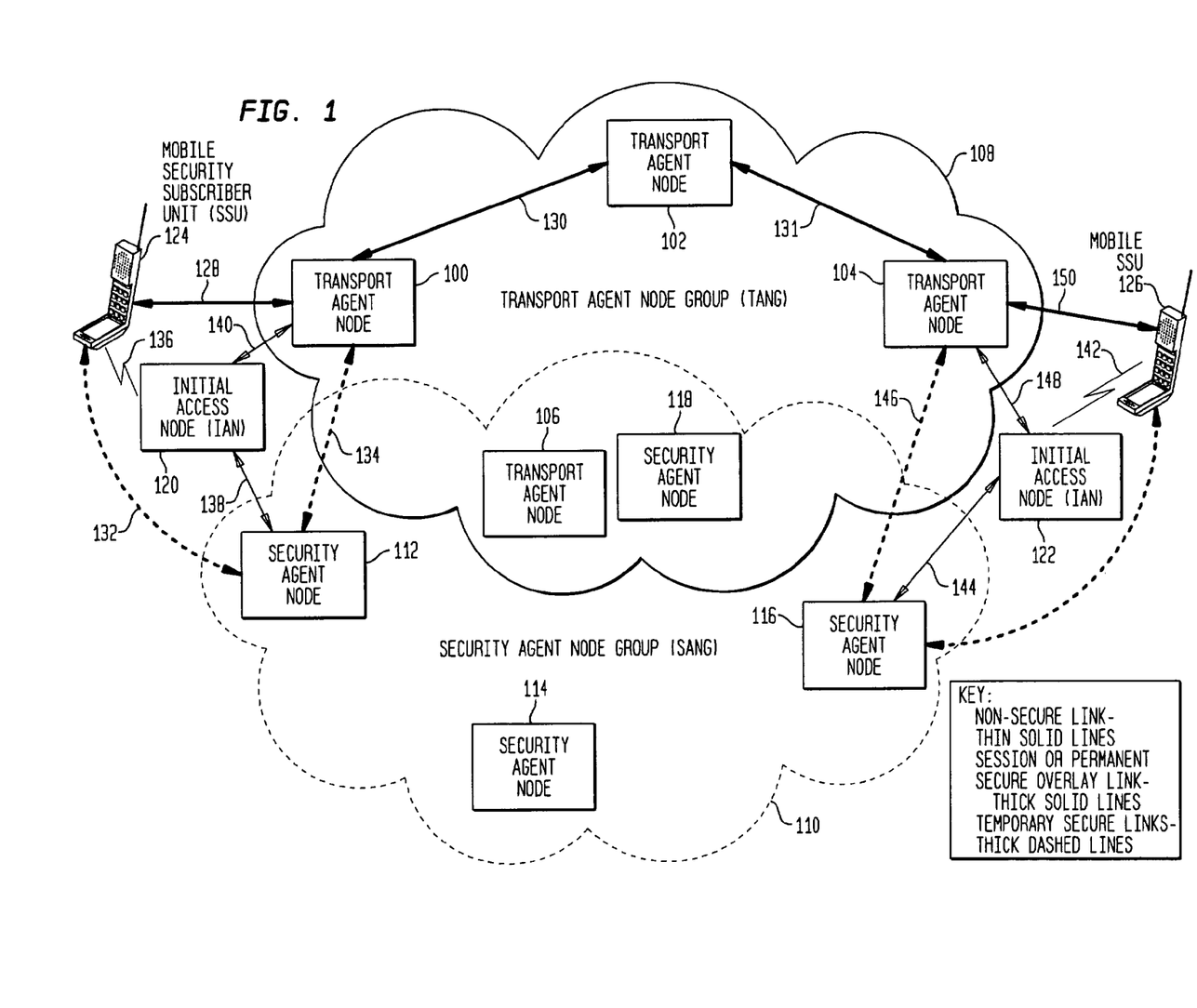
FIG. 1 is a block diagram of an IP network overlaid with a security and mobility overlay architecture (SAMOA) access and transport security network according to one embodiment of this invention.

One embodiment of a SAMOA network is illustrated by FIG. 1. FIG. 1 depicts a secure backbone network overlaid on a conventional IP network. The backbone includes TANs 100, 102, 104, and 106 interconnected by (typically preprovisioned) IPSEC links (not all shown in the figure) to form TANG 108. FIG. 1 also depicts distributed security management function 110. This management function includes SANs 112, 114, 116, and 118 interconnected by (typically preprovisioned) IPSEC links (not all shown in the figure) to form SANG 110. Also depicted are initial access nodes (IANs) 120 and 122 on the periphery of the SAMOA network and SSUs 124 and 126. In FIG. 1, the links that are depicted are those associated with a particular communication session between SSU 124 and SSU 126. In particular, thick solid lines between nodes (e.g., links 128 and 130) indicate session or permanent secure overlay links, thick dashed lines (e.g., links 132 and 134) indicate temporary secure overlay links, thin solid lines indicate non-secure overlay links, and zig-zag lines indicate non-secure wireless links. It should be understood that the links depicted in FIG. 1 are logical links of the overlay network and that there is an implicit physical network underlying the overlay that provides interconnectivity between elements of the network via standard IP routing mechanisms (other than the SSUs, which are dependent on the IANs for access to the network).

Select parts of this underlying physical network that support the communication session between SSU 124 and SSU 126 are depicted in FIG. 1. Specifically, SSU 124 communicates with SAN 112 via IAN 120 using physical (in this case wireless) link 136 and physical link 138. Also, session security, management, and control information that is communicated between SAN 112 and TAN 112 over logical overlay link 134 is actually carried over physical links 138 and 140. Similarly, SSU 126 communicates with SAN 116 via IAN 122 using physical (in this case wireless) link 142 and physical link 144. Also, session security, management, and control information that is communicated between SAN 116 and TAN 104 over logical overlay link 146 is actually carried over physical links 144 and 148. Although only a handful of TANs, SANs, IANs, and SSUs are illustrated in FIG. 1, it should also be understood to one skilled in the art that the concepts of this invention may be scaled to thousands and even millions of elements distributed over a wide geographical area.

In one operational scenario, SSU 124 may be a mobile node such as a PDA, which has subscribed to the SAMOA service for the purpose of communicating securely with another mobile node, such as SSU 126, which may be, for example, a laptop. These SSUs may be within a local geographic region, such as within a corporation headquarters or university campus, or they may be distributed widely across or between continents. The PDA and the laptop may be owned by the same user or different users. If the same user, then, for example, the laptop could be a wireless device linked into the user's corporate network in his office in Seattle, and the PDA (as well as the user) could presently be in a conference room in a customer's headquarters (e.g., in Munich, Germany) or in an Internet café (e.g., Starbucks in downtown San Jose, Calif.). In either case, the user may have updated calendar information on his PDA that he wishes to securely synchronize with his laptop.

In an operational scenario as described above, SSU 124 first registers with SAN 112 via non-secure initial access node (IAN) 120 over unsecured links 136 and 138. IAN 120 may be, for example, a wireless port access entity (PAE) in a metropolitan wireless LAN or an equivalent wireless gateway. Unsecured links 136 and 138 are understood to support standard routing elements and protocols in the non-secure path between the SSU 124 and SAN 112. The SAN authenticates SSU 124 using a key that is shared (i.e., known a priori) between the SAN and subscribing SSU 124. This key is typically programmed into the SSU as part of an initial subscription process, and a copy is maintained in a local or distributed database accessible to SANG 110. The SAN provides authentication information back to the SSU along with other information. The SAN may also optionally provide an "okay to proceed" message to the IAN to instruct the IAN to allow the SSU access to the network. Once mutual authentication is complete, the SSU and the SAN can each independently compute a session key for secure communication between the SSU and the TAN. This session key is computed by the SAN and SSU independently based on processing the key they share according to a procedure that was communicated from the SAN to the SSU during the mutual authentication phase. Next, the session key is communicated from the SAN to TAN 100. This communication might be accomplished by using a secure link that was established (i.e., "nailed-up") a priori between SAN 112 and TAN 100, or alternatively by using a public-key session established between the SAN and the TAN. Alternatively, and preferably, a second shared key that is known to both SAN 112 and TAN 100 is used to establish (via a procedure passed during a mutual authentication phase between them, for example) a second session key to protect a temporary secure link (134) between SAN 112 and TAN 100. This temporary secure link is then used to communicate the first session key from SAN 112 to TAN 100. As a result, SSU 124 and TAN 100 ultimately will both have the (first) session key to use for secure communication between them (via link 128). At this point, SSU 124 is registered and prepared to communicate securely over network 108.

Another SSU 126 similarly registers with SAN 116 via non-secure initial access node (IAN) 122 over unsecured links 142 and 144. SAN 116 and SSU 126 similarly mutually authenticate and generate a session key by making use of a key that is shared between SAN 116 and the subscribing SSU 126. The SAN provides a copy of this session key to TAN 104 (via temporary secure link 146) that it uses to securely communicate with SSU 126 (via link 150).

When SSU 124 wishes to send data packets securely to SSU 126, it does so using the secure link 128 it now has via IAN 120 to TAN 100. TAN 100 provides a secure path via TANG 108 to TAN 104 (i.e., via secure links 130 and 131), and TAN 104 provides secure communications to SSU 126 via IAN 122 over secure link 150. Recall that these links are logical links and SAMOA is an overlay network that is layered on an underlying physical network infrastructure of, for example, a conventional type.

Initial Access Node (IAN)

An IAN is the first hop entity that interacts with an SSU. An IAN is not necessarily trustworthy but it can forward requests to a trusted device (e.g., a SAN or TAN). Thus this entity functions only as a security pass-through. Upon receiving a "connection request" from an SSU, an IAN forwards the request to, for example, the closest security agent node (SAN) that provides authentication and security services as determined by the LAN's administrator. Thus an insecure channel will be initially established between the SSU and the targeted SAN through the IAN. If necessary, this channel may be made secure via a key that is shared between the SSU and the SAN. The connection will likely be routed via existing authentication, accounting, and authorization (AAA) servers (not illustrated) that are already deployed at various locations in the underlying network. These AAA servers may also serve as a pass-through for authentication of subscribers.

Security Agent Node (SAN)

A security agent node (SAN) authenticates an SSU based on a shared key with the SSU and presentation of appropriate credentials by the SSU. In one implementation of a SAMOA network, a standard remote authentication dial-in user services (RADIUS) server may serve as a SAN with minor modifications. The RADIUS protocol is a software-based security authentication protocol developed by the Internet Engineering Task Force (IETF) RADIUS Working Group. Its main functions are authentication, authorization, configuration, and accounting. Centralized authentication, authorization, and configuration of dial-in users provide network security. Accounting then measures the resources that each user consumes. All RADIUS-compatible hardware on a Local Area Network (LAN) can use the same RADIUS server for storing permissions and configuration information. This lets the network administrator maintain one server for all RADIUS-dependent hardware. In a SAMOA network, there may be many SANs in the system and any of them (or all of them) may at some point in time know the shared key of a particular SSU. The set of all security agent nodes in a network is called the SAN group (SANG).

Security Agent Node Group (SANG)

Among other things, the SANG supports gathering of billing information through connection with a billing server (not illustrated). The SANG authenticates an SSU, and the SSU has trust in the SANG through a mutual authentication. In one embodiment, it is the responsibility of the SAN that is first contacted by the SSU to authenticate the SSU, by using communications with other SANs in the SANG overlay network that may hold all or part of the SSU's credentials and/or shared keys. Once a SAN has authenticated an SSU, it directs the SSU to, for example, the closest transport agent node (TAN) and initiates generation of a secure session key by the SSU and provides a copy to the TAN for establishing a secure channel. The closest TAN might be determined by static pre-configuration information or dynamically from the local address that a dynamic host control protocol (DHCP) server (not illustrated) provided to the SSU upon registration. A SAN is typically contacted each time the SSU connects to a new local area network (LAN) or a new public data switched network (PDSN). However, SAMOA does not concern itself with link-layer handovers implemented by a set of LANs or base station controllers, and these will operate transparently to the SAMOA service.

Transport Agent Node (TAN)

A transport agent node (TAN) is the main entity for supporting the secure transport and mobility functions needed by SSUs subscribing to the SAMOA service. Note that TANs and SANs are logical entities and may be implemented as separate physical devices or may share a common hardware platform, potentially with other functions (e.g., a router or host). One can view a TAN as similar to the home agent (HA) and/or foreign agent (FA) of Mobile IP systems but with some key distinctions. HA and FA entities are described in "IP Mobility Support for IPv4, IETF RFC 3344, August 2002 (herein "Mobile IPv4"), incorporated herein by reference in its entirety. In one implementation, with minor modifications, HA/FA components may serve as TANs. Specifically, in SAMOA, a TAN need not be located on the same LAN as the SSU (as required for an HA/FA), but rather can be located further upstream in an internet. Additionally, a TAN is responsible for transport routing including secure multicasting, if needed. The set of all TANs within a SAMOA system is termed the TAN group or TANG.

Transport Agent Node Group (TANG)

The TANG is a secure transport overlay network that is able to set up and revise transport connections for SSUs as necessary. These connections are long-lived secure tunnels between the transport agent nodes. These secure tunnels are implemented using IPSEC transport mode. A discussion of IPSEC transport mode can be found in Touch, J. and Eggert, L., "Use of IPsec Transport Mode for Dynamic Routing," Internet-Draft, draft-touch-ipsec-vpn-04.txt, USC Information Sciences Institute, Jun. 24, 2002, expiration: Dec. 24, 2002, incorporated herein by reference in its entirety. Thus, source SSUs in the system (e.g., SSU 124 in FIG. 1) will have secure communications channels (e.g., link 128) to TANs (e.g., TAN 100), those TANs will have secure communication channels (e.g., link 130) to other TANs within the TANG, and destination TANs (e.g., TAN 104) will have secure channels (e.g., link 150) to destination SSUs (e.g., SSU 126) that are involved in secure communications with the source SSUs. SAMOA end-to-end security is thus based on segmented security.

SAMOA Communications Sessions

The SAMOA service supports two primary types of secure communications sessions: "spontaneous" and "planned." Security subscriber units (SSUs) within a SAMOA network use one of these two types of sessions to establish secure communications with one or more other SSUs. To simplify the discussion, sessions will be described between only two SSUs. Sessions between multiple SSUs, e.g., multicast sessions between a set of mobile nodes, follow by extension.

Spontaneous sessions are analogous to telephone calls or client-server interactions. Planned sessions are analogous to conference calls that are set up by a moderator. SAMOA uses a session ID to indicate the particular session type (e.g., an ID of 0 may be used for spontaneous sessions). The TANs maintain the ID information.

SSUs (in particular mobile devices) may be in one of three primary states when a session is initiated, i.e., ON, OFF, or IDLE. SAMOA supports paging of IDLE SSUs (i.e., SSUs that are powered down or in suspend/quiescent/sleep mode). This feature requires corresponding functionality within the SSU (i.e., a feature equivalent to the "wake on LAN" functionality of, for example, current generation laptops). The success of the paging feature depends on whether or not a particular paged SSU is registered with a SAN. If an SSU is not registered, then there is no network knowledge of where or how to "reach" the SSU. Additionally, because mobile SSUs may go IDLE and then go out of range of an IAN/TAN, successful "wake-up" of even a registered SSU is not guaranteed. Note that "registered" is distinct from "subscribed." "Subscribed" is a relatively permanent state that a device has with respect to the SAMOA service corresponding to having been initialized with a valid SAMOA shared key and maintaining an active status. A device may be deactivated, if, for example, the device's owner fails to pay his or her bill on time. The device will likely still maintain the subscription shared key; however, the SANG subscriber database will be updated with the deactivation status such that the SSU will be denied authorization upon an attempt to register. "Registered," on the other hand, is a more transient state that a mobile device, in particular, may enter and exit on a regular basis as it moves in and out of range of access points (e.g., mobile port access entities (PAEs) in a wireless LAN). A device that is in the ON state will periodically refresh its registration and can therefore be reached quickly since SAMOA maintains an up-to-the-minute record of the SSU's location. A device in the OFF state is unreachable; however, SAMOA supports retries and designation of alternative delivery options based on group policies, as will be discussed later. When an SSU goes from the OFF state to the ON state, it will typically attempt to refresh its registration, which should be successful depending on how long the SSU has been turned OFF relative to the system timeout for non-responders, or it will re-register.

Spontaneous Sessions

Once an SSU has registered with the SANG and established a connection to a transport agent node (herein a "connection agent node (CAN)"), it can start sending IP packets to the CAN for forwarding through the TANG cloud to one or more other SSUs. For example, in the scenario shown in FIG. 1, the CAN for SSU 124 is TAN 100, and the CAN for SSU 126 is TAN 104. A connection agent node is also responsible for delivering packets from other SSUs in the network to its client SSU through this same connection.

An SSU communicates with its CAN through a control protocol. One aspect of this control protocol is the establishment and management of a secure connection from the SSU to the CAN. This control protocol is carried on a user datagram protocol (UDP) connection to a designated (i.e., "well-known") network port of the CAN. The UDP connection is initiated by the SSU and secured by an IPSEC transport mode link that is established between the SSU and the CAN with session keys supplied by a SAN.

Routing and Delivery

A SAMOA network maintains a global hash table (H-table) of routing and other information. This H-table is either identically stored at each TAN or globally distributed throughout the TANG. A TAN, when presented with a destination IP address for an SSU, uses the address to index into the H-table and retrieve various pieces of information about the destination SSU, including the destination SSU's destination TAN address, the next TAN address, if any, (en route to the destination TAN), and the last update times for these entries.

Once a packet is received by a CAN on behalf of its client SSU, the CAN will look up the destination address of the packet in the H-table. Note that this is done using the "static" address or "subscriber" address of a destination SSU, for example. Each CAN maintains an active connection set of SSUs to which it currently has secure connections. If there is no entry in the H-table for a particular destination address, then an entry is created and broadcast to the TANG group for future reference. In one implementation, both SAMOA subscriber and non-subscriber entries are created. In other implementations, only subscriber entries are created to save memory. Creating each entry may involve paging the correspondent SSU if it is in an IDLE state. If a cached entry exists, but has expired, then a request to the TANG group is made to create an updated entry. If a non-expired cached entry exists and it indicates that the destination address is that of a SAMOA subscriber, then the packet is sent to the destination TAN, possibly via one or more intermediate TANs beginning with the "next" TAN for ultimate delivery to a destination subscriber via its connection agent node (CAN).

If the source SSU's CAN is itself the destination transport agent node for a communication, then that CAN will deliver the packet directly to the correct, locally registered SSU through the proper, local, active, secure connection. If the destination address is that of a non-subscriber, then the packet is sent through the Internet for non-secure delivery (e.g., passed to a local, standard network router (not illustrated)).

Note that, in one simplified implementation, the next TAN may be set to the destination TAN itself, assuming there exists a security association between the CAN and the destination TAN, and underlying network routing mechanisms may be used to provide, delivery between TANG elements. In another implementation, the next TAN may be a next-hop TAN that is distinct from the destination TAN. In this case, the TANG may assume more or all of the QOS and routing responsibility along the path from the source SSU's CAN to the destination SSU's CAN.

Maintaining the H-Table

A new destination address of an SSU is added to the subscriber H-table if a valid connection to a destination address has been, or can be, made from some TAN in the TANG. Thus, for example, whenever mobile SSUs connect to their connection agent nodes, this H-table is updated. Furthermore, in some implementations, the connection agent node may periodically update the H-table entries for its set of client SSUs. One implementation allows only one entry for each destination IP address in the H-table. Thus, when a new, conflicting entry is received by the database, it replaces the existing entry using a standard distributed or localized caching discipline, such as least recently used (LRU), taking into account the time stamps for the entries. In some implementations, multiple entries are allowed to exist for a destination address to manage soft handoffs. It is assumed that, for all SSUs supported by SAMOA (i.e., those subscribing to the SAMOA service), a valid entry will at some point exist. Furthermore, when a mobile SSU gets a dynamic source IP address (i.e., a local address, for example, from a dynamic host control protocol (DHCP) server-like mechanism on a wireless LAN), then it is assumed that a domain name system (DNS) entry might also be updated. In the SAMOA network, a mobile typically maintains only a single source address during the lifetime of a session, or potentially, through the lifetime of a registration.

The updating of a next hop entry of an H-table will potentially involve determining a "good" path through the overlay TANG network. This could be handled by standard route optimization routines or protocols run in the overlay networks such as Dijkstra's "shortest path."

There are many solutions to distributing the H-table. In one implementation, the H-table starts out as a lockable, centralized H-table that is copied securely to other nodes via secure remote procedure calls (RPCs). In another implementation, the hash table can be maintained via a mechanism analogous to a home location register (HLR)/visitor location register (VLR).

In yet another implementation, a connection agent node maintains an H-table cache. Whenever a connection agent node gets a destination IP address of a correspondent node, it attempts to determine the destination TAN from its local cache. If there is no entry, then the CAN will multicast a request-destination-TAN-address message (seeking the static destination address of the correspondent) to the TANG (this assumes a multicast tree is set up in the overlay network). The transport agent node that is the connection agent node of the destination address SSU will unicast a response-TAN-destination-address reply message directly to the requester and the home TAN. If there is no answer, then a policy associated with the subscriber and the group (i.e., enterprise) with which the subscriber is associated, may be followed. For example, a policy for sensitive communications might require immediately dropping the packet, or, for limited sensitivity material, it might allow sending the packet over a non-secure connection to an alternative SSU, potentially a non-subscriber, after some timeout period. A non-subscriber cache entry may be created for efficiency reasons within the H-table. Whenever a TAN accepts a new connection from an SSU, it multicasts an update-cached-H-table notification message to the TANG group. Upon receipt of this message, the entry is updated if it exists; otherwise, it can be either created or discarded. Because mobile SSUs may be out of reach or in transition between CANs, a failure to reach an SSU should be followed by a series of delay/retry cycles before an SSU is determined to be unreachable. Optional association of SSUs with "enterprise groups" allows global (potentially corporate or government) policies (e.g., governing forwarding and delivery of packets) to be applied to groups of SSUs.

Planned Sessions

A planned session is analogous to a secure conference call between one or more participants. Participants will use a session ID to identify a session, for the purpose of joining or leaving the session. Joining a planned session is subject to authorization. A planned session builds upon prior work related to application-directed multicast routing. See, e.g., S. Aggarwal, S. Paul, D. Massey, and D. Calderaru, "A Flexible Multicast Routing Protocol for Group Communication," *Computer Networks*, Volume 32, No. 1, pp. 35-60, January. 2000, incorporated herein by reference. Transport agents nodes (TANs) use the session ID to decide how to route packets received and destined to various SSUs. Planned sessions will have routing paths within the TANG already set up to deliver the packets. Note that, for each planned session, there is typically a valid group of participants defined, and a packet associated with a particular session would only be delivered to participants associated with that session. This mechanism supports multicasting over dynamic secure connections, a function that, up until now, had no practical solution.

Since the TANs form an overlay network (i.e., the TANG) that can support many types of efficient routing, the TANG can be designed to support quality of service (QoS) based on predefined routes with guaranteed bandwidth. This aggregation of traffic over a set of "wide" pipes can make transport efficient as well as provide guaranteed delay properties. Multicasting may be supported by the TANs by the duplication of packets and the subsequent insertion of those packets into the appropriate tunnels in the TANG. As the network grows, it need not be fully connected, but rather can be designed as a mesh network with TANs positioned at sites determined by an off-line or on-line optimization algorithm.

Switching Security Agent Nodes and Transport Agent Nodes

A mobile SSU may switch its connection from one IAN to another whenever it does not have a good connection or when an alternative IAN presents an improved connection. SAMOA does not specifically address these lower-level switching issues. However, when a mobile SSU does decide to switch, SAMOA assumes that the SSU needs to be re-authenticated. This is because the SSU may be moving across connections that are controlled by separate entities (e.g., from one LAN to another where each LAN uses a different authentication entity). One implementation of the SAMOA network thus supports authentication such that one security agent node (SAN) can authenticate a given SSU via a number of different IANs. In this way, the SAN may concurrently approve a connection of the mobile to any one of those IANs, thereby allowing much faster authentication of a mobile SSU as it passes from IAN to IAN.

One implementation of the SAMOA service provides for multiple SANs to direct an SSU to maintain the same TAN as its CAN through multiple registrations. Note that, as a mobile SSU moves from place to place, it will register via various IANs and SANs in the SAMOA network. Since the TAN connections take some time to set up, maintaining the same TAN through these registrations creates efficiencies, since this mechanism minimizes the need for the mobile to continuously set up new TAN connections. This feature is supported by SAMOA by virtue of the shared knowledge aspects of the SANG overlay.

In general, in the SAMOA network, when a new connection is needed, the process is to first set up the new connection, leaving the old connection as is, and once the new connection is established and bearing data, then the old connection is torn down and deleted from the database. Since SSUs continuously move from location to location, CANs generally periodically parse through their SSU client database and attempt to update the status of the associated links. Once a new TAN is contacted by an SSU, it becomes the connection agent node (CAN) for that SSU and the CAN may immediately multicast the fact that it now has the mobile as part of its connection set. The forwarding of packets from all other TANs to the new CAN is thus essentially immediate and no special provision needs to be made to accommodate this.

Other Services

Up to this point, features of SAMOA have been described that support secure SSU-to-SSU communication services. This description applies equally well to mobile SSUs as well as to static SSUs (e.g., servers associated with financial institutions). However, SAMOA subscribers may also connect to nodes that are not SAMOA subscribers. This is advantageous in providing general-purpose communications services for SSUs. Likewise, SAMOA supports interoperability with enterprise virtual private network (VPN) services.

Non-Secure Services

In one implementation of the SSU-to-non-SSU embodiment of the SAMOA network, a packet from an SSU (e.g., SSU-1) is parsed by the SSU's connection agent node (CAN) and determined to have a destination address that does not correspond to a SAMOA subscriber (i.e., corresponds. to a non-secure user or at least non-SAMOA-secured subscriber). In this case, the original IP packet is simply sent over the "Internet" by the CAN using, for example, the services of a standard local router (not illustrated). Recall the assumption that the static source address of the SSU is from the range of addresses on the same LAN as the home transport agent node for the SSU.

One function of the home transport agent node for an SSU is to advertise (e.g., via address resolution protocol (ARP)) the static address for SSUs that are assigned to them (e.g., SSU-1). The return packet from the non-subscriber (e.g., from a non-secure Yahoo website, with source address "Yahoo" and destination address "SSU-1") arrives at the home transport agent node that is advertising addresses for SSU-1 (i.e., proxy ARPing for its subscribers). In this case, the home transport agent node processes the packet and securely tunnels it to the current connection agent node of the SSU (as was discussed earlier), for final delivery to the SSU. Note that the transport is secure between the home transport agent node and the current connection agent node and between the connection agent node and the SSU. It is non-secure between the connection agent node and the non-subscriber in the forward direction and between the non-subscriber and the home transport agent in the reverse direction.

In an alternative implementation, if the mobile node wishes to send some packets using SAMOA security services and other packets without using SAMOA security services (assuming a higher-level application can force the correct encapsulation), then this can be managed by using a different virtual interface that is provided through the SAMOA client application on the SSU for sending IP packets based on information in the SSU routing table.

VPN Services to Enterprises

So far, secure communications services between mobile (or static) nodes that are SAMOA subscribers (i.e., SSUs) and between SSUs and non-secure entities have been discussed. However, some enterprises may want to offer secure communications services only among their own employees or members. They may also, for example, wish to be able to authenticate these employees using their own authentication services. SAMOA also supports these features.

With regards to authentication, an enterprise may wish to have a mobile be authenticated by an enterprise authentication, accounting, and authorization (AAA) server of its own. In this case, the SAMOA security agent node that authenticates the SSU consults the subscriber's personal profile information and the profiles of enterprises of which the subscriber is a member. If the "alternative authentication server" field is set, then the SAN performs a second-level authentication of the SSU using the designated AAA agent before providing further services (i.e., secure session transport keys). In this case, the SAN acts as a pass-through for the second-level authentication system and provides the SSU credentials to the AAA agent and receives authentication confirmation before proceeding with its own authentication. In some implementations, the SAN may authenticate in parallel with the designated AAA agent, but, in either case, the SAN typically confirms authentication to the SSU only if both authentications pass.

In the case where an enterprise may wish to restrict the users with which an enterprise-associated SSU can interact, TANs within the SAMOA network consult enterprise policy and permission lists before routing to/from unauthorized entities. For example, if an SSU belonging to company ACORN is allowed to contact only other ACORN subscribers, then, on connecting to its CAN, the SSU, when sending packets, would face further filtering of its source packets. The CAN would process only packets with a destination IP address of a valid ACORN subscriber. The others would be dropped or returned, depending on the policy in place for the ACORN enterprise. Similarly, upon delivery (the packet may have come from a non-secure site), only packets with valid ACORN subscriber source IP-addresses would be sent to the SSU. Note that this implementation of the SAMOA network would bear a higher burden of processing of packets in the TANs than an implementation that does not support this policy.

SAMOA vs. Mobile IPv4 and IPv6

This comparison assumes a working knowledge of the terminology, operation, and overhead of Mobile IPv4 (referenced earlier) and Mobile IPv6 as covered in Perkins, C. E., Johnson, D. B., "Mobility Support in IPv6," $2^{nd}$ Annual Conference on Mobile Computing and Networking (Mobi-Com'96), Nov. 10-12, 1996, Rye, N.Y., copyright Association of Computing Machinery (ACM), incorporated herein by reference in its entirety, as well as an understanding of the SAMOA network as described herein.

SAMOA Advantages Over Mobile IP

In general, Mobile IPv4 does not address security issues per se, except to permit extensions within the registration protocol to insure that only an appropriate mobile can register with the home and foreign agents. Furthermore, although secure tunneling between home and foreign agents is possible in Mobile IPv4, it is not mandated. Thus, Mobile IPv4 views its main function as supporting mobile layer 3 routing. Mobile IPv6 has a greater focus on security, but the use of security in the context of Mobile IPv6 is somewhat problematic in that the communication between a mobile and a correspondent host is not very secure. In particular, in order to redirect the host to the new location of the mobile, a number of steps must be followed, as acknowledged by the Mobile IPv6 authors. Thus, it is unlikely to be a basis for a true security architecture. In contrast, SAMOA is focused primarily on both security and mobility, and subsequently on efficiency. Possible advantages of SAMOA over Mobile IP are discussed in the following sections. These advantages are discussed in the context of a preferred implementation of SAMOA and do not necessarily all apply to all possible implementations.

Key Distribution

Using shared keys, SAMOA has only an N×1 key distribution problem versus a N×N problem in Mobile IP. SAMOA supports a security model of shared keys. The shared key of an SSU is maintained by the SAN group and is thus set up typically with a single entity. Once the mobile has an authorized shared session key to communicate with its TAN, it can communicate with anyone else who is a SAMOA subscriber. In SAMOA, N SSUs may be supported with order (N) shared keys. In Mobile IP, on the other hand, if a mobile wants to communicate in a secure way with another mobile, there must be a shared key between them in order to support end-to-end IPSEC tunneling when public keys are not used. This means that to support N subscribers, Mobile IP requires order ($N^2$) shared keys. What is more, the distribution and management of these keys is quite problematic. Thus, SAMOA, in this end-to-end case, has reduced an order ($N^2$) problem to an order (N) problem. A public key system may reduce the end-to-end Mobile IP problem involving N subscribers to an order (N) problem as well, since each mobile might have a private key and a public key, and it might be necessary to effectively manage certificates ensuring authenticity of only the public keys. However, the certificate problem is itself not trivial for large numbers of subscribers. In addition, generating appropriate public and private key pairs for such large groups may be a problem and would certainly not be as efficient as generating the same number of shared keys.

Agent Node Location Flexibility

In SAMOA, the transport and security agent nodes are located at arbitrary locations upstream from the SSU, making security manageable. This is in contrast to Mobile IP where the home and foreign agents generally must be on the same local LAN as the access port of the mobile. In Mobile IPv4, the registration procedure normally involves registering first with a foreign agent that is on the same layer 2 connection as the mobile and then registering with the home agent. For example, in a LAN, the foreign agent must be reachable through a MAC address and thus must be on the same sub-LAN as the mobile. In Mobile IPv6, the notion of foreign agent is dispensed with and the mobile always registers directly with a home agent. However, this agent might not be at all close to the current location of the mobile. In contrast, in SAMOA, the security agent node and the transport agent node are arbitrarily upstream from the mobile and thus need only be reachable by an IP layer datagram. This is an enormous advantage in terms of security, since fewer numbers of security agent nodes are needed as compared with foreign agents, and the security problem is tremendously reduced since security agent nodes are likely to be physically protected. In contrast, in Mobile IPv4, a foreign agent would typically be required on each LAN that provides a potential access point for the mobile. This is a tremendous security problem if one needs to insure physical security for these foreign agents.

Firewall Traversal

Problems traversing firewalls can be reduced with SAMOA as compared to Mobile IP. In SAMOA, the transport agent node (TAN) is connected with a secure tunnel to the SSU. Since the mobile SSU initiates the connection, most issues of traversing firewalls are non-existent for SAMOA. SAMOA merely requires the SSU to connect securely with a TAN, which can be done by allocating well-known ports to these agent nodes. In contrast, in Mobile IP, going through a firewall to reach a home agent is always an issue (at two points, since both the mobile and the home agent may be behind separate firewalls). Furthermore, the home agent and the foreign agent may have problems with firewalls during registration of the mobile to the home agent. In SAMOA, there is no need for a mobile to have anything to do with a "home" agent that is LAN-based. In SAMOA, the mobile talks only to a transport agent node that expects to be communicated to and will thus typically not refuse connection initiated by the mobile. Communication in SAMOA is generally from inside a firewall to outside the firewall, while home agents are typically inside a firewall and might be unreachable by a potential correspondent located outside the firewall. The SAN group in SAMOA supports security functions but it does not function at the link layer. It is thus not restricted to communicate or be reachable by an SSU using only medium-access or link-layer addresses but may more flexibly be located anywhere on an internet since it utilizes full addressing. Similarly, since the TAN group is also at a higher level, the implementation of secure tunnels between them does not cause any firewall issues to develop since both SANs and TANs are protected on their overlay network.

Transport Efficiency and Security

Transport is more efficient in SAMOA for subscribers as compared to the inefficient triangular routing required by Mobile IPv4. Because the TANG manages transport by determining the closest connection agent to the correspondent mobile/SSU, the packets are directed efficiently through the appropriate tunnels. This overlay aspect thus not only can ensure a high level of security but can be efficient in routing since the path that is followed in the overlay network can also take into account many high-level issues such as the quality of service of the tunnel. Furthermore, the secure tunnels would normally be pre-provisioned and set up in advance. In Mobile IP, however, tunnels would normally-be created on-the-fly between home and foreign agents since it is unlikely that one would want to maintain them all the time. In contrast, SAMOA expects that the TAN group is a smaller "managed" group with long-lived IPSEC nailed-up connections. IPv6 supports an option of a home address destination header that can be used by correspondents to send a packet directly to the current location of the mobile. The security aspects of this (i.e., changing bindings) unfortunately involve several complex exchanges, and the protocol is not very secure.

Routing

The routing scheme in SAMOA as implemented by the TANG through the H-table mechanisms is quite different from what occurs in Mobile IP. The role of the connection agent in SAMOA permits a variety of filtering and routing capabilities that the TANG can implement for both security and efficiency. In contrast, the role of home and foreign agents in Mobile IP is typically much more limited. Although there may be some scalability cost involved in maintaining the H-table (since the routing by the transport agent uses the full host address), this can be minimized by using caching. Additionally, use of multicast in the SANG and TANG clouds further reduces control traffic.

Initial Access

SAMOA uses a non-secure entity for initial access to the network (the IAN). In Mobile IP, a similar level of security might be managed by attaching a trusted foreign agent to each local LAN supporting a mobile's access port to the network. Much effort is being expended today in making entities such as port access entities (PAEs) on wireless LANS able to implement secure connections between a mobile and the PAE (note, for instance, Microsoft's support for the extensible access protocol (EAP)). In SAMOA, by contrast, the basic assumption is that this entity is not required to be secure but instead acts as a pass-through for secure communication setup between an SSU and a SAN or an SSU and a TAN.

Logical Separation of Transport and Security

SAMOA allows a clear, logical separation of transport and security issues. This is because, in SAMOA, authentication functions are performed logically by security agents, and transport concerns are relegated to transport agents. In contrast, in Mobile IP, there is a greater mixture of these functions in the home and foreign agents. Additionally, security was not the initial concern of Mobile IP, and issues such as working with AAA servers are only now being addressed.

Compatibility and Evolution

SAMOA works with IPv4 and can similarly work with IPv6 when it becomes widely available. Since, in some implementations, TANs within a SAMOA network perform their own routing, related features of IPv6 can be bypassed. This removes reliance of the SAMOA service on these planned but untested features of IPv6. Additionally, it is unclear when IPv6 will be deployed in a major way; thus, this lack of dependence allows the SAMOA service to be viable today.

Ongoing Data Flows and Routing

In Mobile IPv4, the mobile (typically) first needs to be connected to a foreign agent on a local link. A packet sent from a correspondence host (CH) in Mobile IPv4 is first sent to the home address of the mobile and intercepted by the home agent. The home agent tunnels the packet to the foreign agent (FA), which delivers the packet directly since the FA is assumed to be on the same link as the mobile. When the mobile sends a packet to the correspondent host it is normally sent directly with no tunneling. Thus, in Mobile IP, there is triangular routing (i.e., CH to HA to FA/mobile and return to CH). Since the prior example includes no discussion of security, there is no relevant comparison with a SAMOA network that can be performed. However, in the case where security is overlaid on Mobile IP, the scheme can be compared with SAMOA. The terminology "original IP datagram" in the following refers to the original IP packet (including the header). Overheads are with reference to this original IP datagram. In the following, different contexts for comparison are presented with a focus on performance in the routing of data flows. Security between mobiles communicating with each other and arbitrarily moving around and connecting to both LANs on public networks and private (protected by firewalls) networks will be termed "full mobile security." Security desired by a mobile to connect to a node in a specific private network though an enterprise firewall will be termed "VPN mobile security." Finally, lack of security or only limited security (e.g., registration only) is termed "no security."

Full Mobile Security

In this section, we assume that full mobile security is desired between two mobile nodes moving about arbitrarily and communicating with each other. For comparison, in SAMOA, both mobiles are thus subscribers, while, for Mobile IPv4 to support security, we assume end-to-end IPSEC is implemented by the mobiles.

For a preferred implementation of the SAMOA network, to implement a connection from a mobile to a CH to a mobile involves 56 bytes of IPSEC/tunnel/UDP overhead to a connection agent, 56 bytes of overhead through the rest of the network, and another 56 bytes from the connection agent to a correspondence host (CH), assuming no firewall issues. No triangular routing is needed. For Mobile IPv4, end-to-end IPSEC is used, and the overhead would be 48 bytes in tunnel mode (possibly 28 bytes in transport mode) at all times plus the overhead for the FA-to-HA tunnels which would be 20 bytes for the IP-in-IP tunnels in both directions. Note that any firewalls would have to be configured to allow the packets through, and this might be a problem as the mobile moves.

Although end-to-end IPSEC for the mobiles using Mobile IP may be feasible, there are two major problems. First of all, for each correspondent, a separate IPSEC tunnel must be set up for any communication. Thus, a shared key (the likely method for setting up the tunnel) would be needed for each CH. Secondly, firewall problems for a mobile connecting to a private network may be much more complex in practice. Furthermore, the two-way triangular routing probably doubles each roundtrip time on average.

VPN Mobile Security

If the mobile wants to connect to a VPN gateway of an enterprise, under Mobile IP, the basic connection can be done by using a layer-two point-to-point (PPP) protocol link, extended to the gateway by a layer-two tunneling-protocol (L2TP) tunnel. (L2TP is an extension to the PPP protocol that enables ISPs to operate VPNs by merging the best features of two other tunneling protocols: PPTP from Microsoft and L2F from Cisco Systems.) Alternatively, direct IP connectivity can be assumed. In either case, an IPSEC tunnel to the gateway from the mobile needs to be established.

In the case of Mobile IP, a connection from the mobile to the VPN gateway and on to the CH will require PPP overhead of 8 bytes to a L2TP access concentrator (LAC) (questionable security) and the layer-2 tunnel from the LAC to the L2TP network server (LNS) (the gateway), which results in an overall overhead of roughly 76 bytes. If direct connectivity is assumed using tunnel mode, then the overhead is reduced to 48 bytes. Traffic on the other side of the VPN gateway is likely in the clear, which creates a problem unless another level of IPSEC is used to the correspondence host.

In the case of a SAMOA network, the firewall is transparent. In this case, the overhead is the same as without a firewall issue, except that the gateway has allowed the CH to connect to a transport agent node. This assumes that the enterprise subscribes to the SAMOA service. The gateway is thus basically not needed for SAMOA-related traffic. If desired, the VPN gateway itself might be connected to a transport agent, in which case, it could forward the traffic in the clear to the private network.

While the SAN and the TAN are represented logically as distinct elements in the various embodiments of the present invention, it is possible for the SAN and the TAN to be implemented as a single network element as would be understood to one skilled in the art.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

The present invention may be implemented as circuit-based processes, including possible implementation on a single integrated circuit. As would be apparent to one skilled in the art, various functions of circuit elements may also be implemented as processing steps in a software program Such software may be employed in, for example, a digital signal processor, micro-controller, or general-purpose computer.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

I claim:

1. A security management and secure transport system comprising:
a security agent node group (SANG) serving as a system-wide security authority and having at least one security agent node (SAN); and
a transport agent node group (TANG) serving as a backbone for secure communications and having at least one transport agent node (TAN), wherein:
a security subscriber unit (SSU) communicates with the SANG over a non-secure link to establish a first session key at the SSU;
then the SAN communicates with the TANG, wherein (1) the SAN transmits information to the TANG via a path that bypasses the SSU and (2) the TANG uses the information to establish the first session key at the TANG; and
then the SSU communicates with the TANG over a secure link based on the first session key.

2. The system of claim 1, wherein:
the SANG has two or more SANs that are linked to each other via a first secure protocol;
the TANG has two or more TANs that are linked to each other via a second secure protocol.

3. The system of claim 2, wherein at least one of the first and second secure protocols is IPSEC.

4. The system of claim 2, wherein:
the TANG forms a secure transport overlay network adapted to:
provide TAN-to-TAN routing; and
set up and revise transport connections for the SSU; and
the SANG is adapted to manage the distribution of shared keys to TANG and SANG nodes.

5. The system of claim 4, wherein at least one SAN shares a common hardware platform with at least one TAN.

6. The system of claim 1, wherein one or more additional SSUs register with the SANG to each establish one or more corresponding session keys that allows each of the one or more additional SSUs to securely connect to the TANG and thereby to securely connect to any other of the one or more additional SSUs and the SSU.

7. The system of claim 6, wherein:
the system is adapted to support a planned session for the SSU and the one or more additional SSUs, the planned session identified by a session ID;
the SSU and the one or more additional SSUs are adapted to join and leave the planned session by use of the session TD; and
the TANG is adapted to use the session ID in routing packets to and from the SSU and the one or more additional SSUs.

8. The system of claim 1, wherein:
the SANG supports proxy authentication to support virtual private networks;
the SANG supports billing for SSU communication sessions; and
the security management and secure transport system supports secure multicasting.

9. The system of claim 1, wherein:
the SANG and the SSU each have a copy of a first shared key;
the SANG conveys to the SSU a first method of processing the first shared key, without conveying the first shared key itself; and
the SANG and the SSU independently implement the first method to generate, and thereby establish, local copies of the first session key based on the first shared key.

10. The system of claim 9, wherein:
the SANG conveys to the TANG a second method of processing a second shared key that is shared between the SANG and the TANG, wherein the SANG and the TANG independently implement the second method to generate, based on the second shared key, local copies of the second session key; and the SANG establishes a secure communication link to the TANG based on the second session key and conveys the first session key to the TANG over the secure communication link.

11. The system of claim 9, wherein each of at least two SANs in the SANG has a copy of the first shared key associated with the SSU.

12. The system of claim 1, wherein the TANG is overlaid on a wireless network.

13. The system of claim 1, wherein at least one TAN maintains at least part of a hash table to facilitate routing in the TANG, wherein the at least one TAN maintains an entry in the hash table for at least one SSU that is currently connected to the TAN.

14. The system of claim 1, wherein the SSU registers with the SANG via an initial access node (IAN).

15. The system of claim 14, wherein the SANG is adapted to approve registration of the SSU via more than one IAN at a time.

16. The system of claim 1, wherein at least one SAN comprises a server running a version of the remote authentication dial-in user services (RADIUS) protocol.

17. The system of claim 1, wherein at least one SAN in the SANG and the SSU mutually authenticate each other based on a shared key.

18. The system of claim 1, wherein the system is able to page an idle SSU and the idle SSU is adapted to wake up in response to the page.

19. The system of claim 1, wherein a home TAN in the TANG supports forwarding of packets from the home TAN to a current connection agent node (CAN) TAN using a tunneling protocol.

20. The system of claim 1, wherein the SANG directs a mobile SSU to access the TANG via a single TAN for more than one registration with the system as the mobile SSU moves between access points in the system.

21. The system of claim 1, wherein at least one TAN in the TANG supports enterprise policy lists.

22. The system of claim 1, wherein at least one of the TANG and the SANG is reachable by an IP layer datagram.

23. The system of claim 1, wherein the SSU initiates a connection with the system.

24. The system of claim 1, wherein links between TANs in the TANG are pre-provisioned.

25. The system of claim 1, wherein, when the TAN receives a packet that is not destined for an SSU, the TAN detunnels the packet and passes it to an ordinary internet router for non-secure routing to its destination.

26. The system of claim 1, wherein the secure link based on the first session key bypasses the SANG.

27. A method for security management and secure transport comprising:

linking one or more security agent nodes (SANs) via a first secure protocol to each other into a security agent node group (SANG), and linking one or more transport agent nodes (TANs) via a second secure protocol to each other into a transport agent node group (TANG), providing a first shared key to a first security subscriber unit (SSU), wherein the first shared key is known to the SANG, and using the first shared key to establish a first session key that allows the first SSU to securely connect to the TANG.

28. The method of claim 27, wherein:

the SANG has two or more SANs that are linked to each other via a first secure protocol;

the TANG has two or more TANs that are linked to each other via a second secure protocol;

wherein at least one of the first and second secure protocols is IPSEC.

29. The method of claim 27, wherein at least two SSUs register with the SANG to each establish at least one session key that allows each SSU to securely connect to the TANG and thereby to securely connect to each other.

30. The method of claim 29, further comprising establishing a planned session for the at least two SSUs, wherein:

the planned session is identified by a session ID;

each of the at least two SSUs can join and leave the planned session by use of the session ID; and the TANG uses the session ID in routing packets to and from the at least two SSUs.

31. The method of claim 27, wherein at least one TAN in the TANG supports enterprise policy lists.

32. The method of claim 27, further comprising:

conveying the first session key from the SANG to the TANG over a secure communication link.

33. The method of claim 27, wherein:

the TANG forms a secure transport overlay network adapted to:
  serve as a backbone for secure communications;
  provide TAN-to-TAN routing; and
  set up and revise transport connections for the SSU; and
the SANG is adapted to manage the distribution of shared keys to TANG and SANG nodes.

34. The method of claim 33, wherein at least one SAN shares a common hardware platform with at least one TAN.

35. The method of claim 27, wherein the secure connection from the SSU to the TANG bypasses the SANG.

* * * * *